(12) United States Patent
Choi et al.

(10) Patent No.: US 9,377,652 B2
(45) Date of Patent: Jun. 28, 2016

(54) LIQUID CRYSTAL DISPLAY DEVICE

(71) Applicant: LG Display Co., Ltd., Seoul (KR)

(72) Inventors: Eun-Hee Choi, Paju-si (KR); Jin-Seo Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 102 days.

(21) Appl. No.: 14/035,612

(22) Filed: Sep. 24, 2013

(65) Prior Publication Data

US 2014/0085569 A1 Mar. 27, 2014

(30) Foreign Application Priority Data

Sep. 26, 2012 (KR) .................. 10-2012-0107401
Nov. 29, 2012 (KR) .................. 10-2012-0136978

(51) Int. Cl.
*G02F 1/1335* (2006.01)
*G02F 1/1333* (2006.01)

(52) U.S. Cl.
CPC ...... *G02F 1/133606* (2013.01); *G02F 1/13336* (2013.01); *G02F 1/133615* (2013.01); *G02F 2001/133317* (2013.01)

(58) Field of Classification Search
None
See application file for complete search history.

(56) References Cited

U.S. PATENT DOCUMENTS

| | | | |
|---|---|---|---|
| 7,658,530 B2 * | 2/2010 | Liu ............................. | 362/606 |
| 2004/0150997 A1 * | 8/2004 | Ouderkirk et al. ............ | 362/255 |
| 2008/0158468 A1 | 7/2008 | Kim et al. | |
| 2009/0052206 A1 * | 2/2009 | Matsui et al. ................ | 362/612 |
| 2009/0185100 A1 * | 7/2009 | Matsuhira et al. ............ | 349/58 |
| 2010/0128201 A1 * | 5/2010 | Lee ................... | G02F 1/134336 349/62 |
| 2010/0238686 A1 * | 9/2010 | Weber et al. .................. | 362/609 |
| 2010/0302717 A1 * | 12/2010 | Oh ..................... | G02F 1/133308 361/679.01 |
| 2011/0025942 A1 | 2/2011 | Lee | |
| 2011/0128463 A1 | 6/2011 | Ji et al. | |
| 2011/0255024 A1 * | 10/2011 | Chung ................ | G02B 6/0031 349/58 |
| 2011/0261291 A1 | 10/2011 | Park et al. | |
| 2011/0261585 A1 * | 10/2011 | Shibata et al. ................ | 362/607 |
| 2012/0086890 A1 * | 4/2012 | Shimokawa et al. ........... | 349/65 |
| 2012/0092813 A1 * | 4/2012 | Kao et al. ................. | 361/679.01 |
| 2012/0257417 A1 * | 10/2012 | Lee ................... | G02F 1/133308 362/622 |
| 2012/0287355 A1 * | 11/2012 | Oya .................... | G02B 6/0031 348/790 |

FOREIGN PATENT DOCUMENTS

| | | |
|---|---|---|
| CN | 1580898 A | 2/2005 |
| CN | 101211048 A | 7/2008 |
| CN | 101281323 A | 10/2008 |
| CN | 101419357 A | 4/2009 |
| CN | 102081259 A | 6/2011 |
| CN | 102236203 A | 11/2011 |
| JP | 06-015006 U | 2/1994 |

(Continued)

OTHER PUBLICATIONS

Japan Patent Office, Office Action, Japanese Patent Application No. 2013-199120, Sep. 25, 2014, eleven pages.
European Patent Office, European Search Report and Opinion, European Patent Application No. 13185045.5, Jan. 8, 2014, six pages.
State Intellectual Property Office of the People's Republic of China, First Office, Chinese Patent Application No. 201310435452.8, Sep. 1, 2015.

*Primary Examiner* — Ryan Crockett
(74) *Attorney, Agent, or Firm* — Fenwick & West LLP

(57) ABSTRACT

A liquid crystal display device includes a liquid crystal panel; a backlight unit disposed under the liquid crystal panel and including a light guide plate and a light emitting diode (LED) assembly at a side of the light guide plate; a main frame surrounding a side of the backlight unit and having a light-diffusion property.

20 Claims, 8 Drawing Sheets

(56) References Cited

FOREIGN PATENT DOCUMENTS

| | | |
|---|---|---|
| JP | 07-094008 A | 4/1995 |
| JP | 2005-158707 A | 6/2005 |
| JP | 2006-126583 A | 5/2006 |
| JP | 2008-021583 A | 1/2008 |
| JP | 2009-047916 A | 3/2009 |
| JP | WO 2011/096247 * | 8/2011 |
| JP | 2011-249320 A | 12/2011 |
| JP | 2012-145843 A | 8/2012 |
| KR | 10-2009-0019708 A | 2/2009 |
| WO | WO 2008/120879 A1 | 10/2008 |

\* cited by examiner

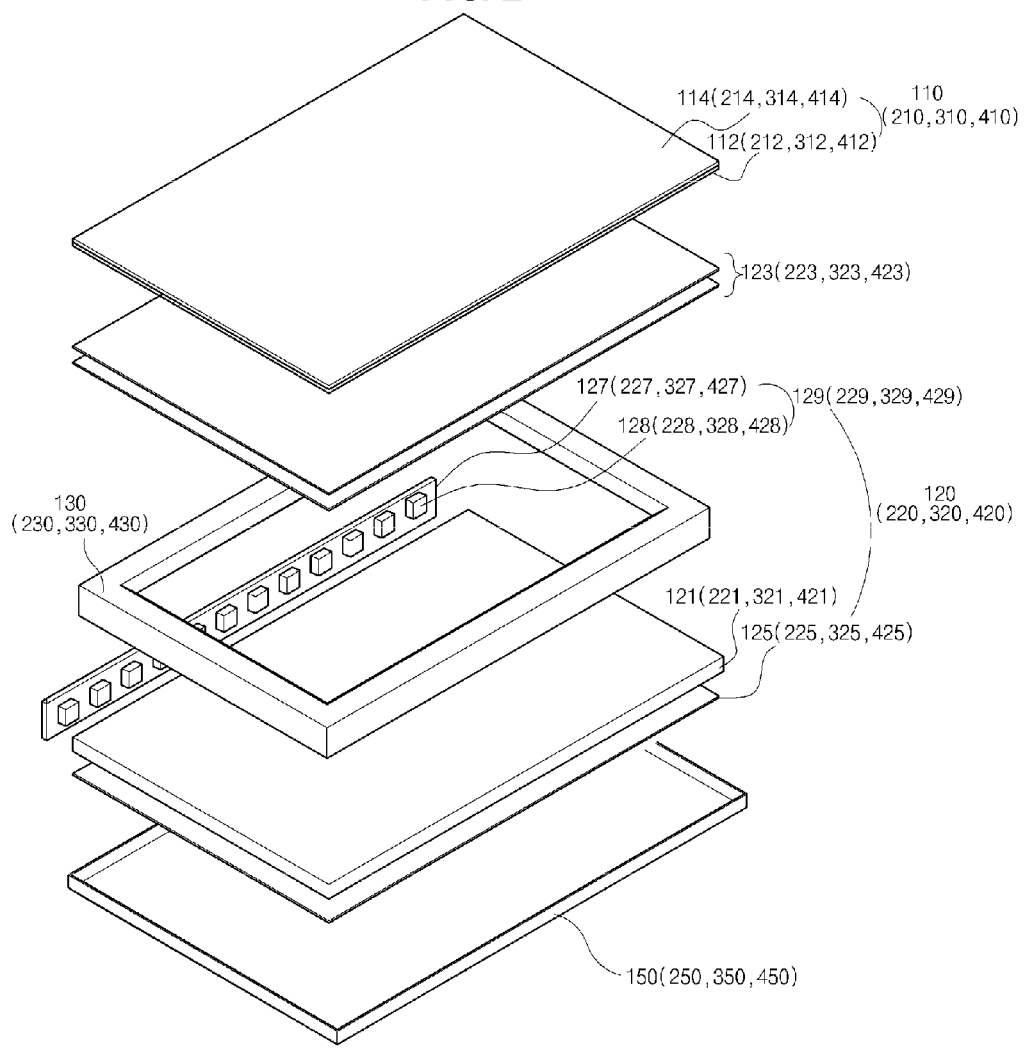

LIQUID CRYSTAL DISPLAY DEVICE

The present application claims the benefit of Korean Patent Application Nos. 10-2012-0107401 and 10-2012-0136978 filed in Korea on Sep. 26, 2012 and Nov. 29, 2012, respectively, all of which are hereby incorporated by reference.

BACKGROUND OF THE INVENTION

1. Field of the Invention

The present invention relates to a liquid crystal display (LCD) device and more particularly to an LCD device having an improved image-display region.

2. Discussion of the Related Art

The LCD device, which uses optical anisotropy and polarization properties to display an image, is widely used for notebook computers, monitors, TV, and so on, because of its high contrast ratio and characteristics adequate to display moving images.

The LCD device includes a liquid crystal panel having a first substrate, a second substrate and a liquid crystal layer. The first and second substrates face each other, and the liquid crystal layer is interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel.

The backlight unit may include a cold cathode fluorescent lamp (CCFL), an external electrode fluorescent lamp or a light emitting diode (LED) as a light source. Among these light sources, the LED is widely used because it has advantages in size, power consumption, reliability and so on.

FIG. 1 is a cross-sectional view of the related art LCD device. In FIG. 1, the LCD device includes a liquid crystal panel 10, a backlight unit 20, a main frame 30, a top frame 40 and a bottom frame 50.

The liquid crystal panel 10 includes a first substrate 12, a second substrate 14 and a liquid crystal layer (not shown). The first and second substrates 12 and 14 face each other, and the liquid crystal layer is interposed therebetween. First and second polarization plates (not shown) are disposed on opposite sides of the liquid crystal panel 10.

The backlight unit 20 is disposed under the liquid crystal panel 10 to provide light toward the light crystal panel 10. The backlight unit 20 includes an LED assembly 29, a reflective sheet 25, a light guide plate 21 and an optical sheet 23. The LED assembly 29 is arranged along at least one side of the main frame 30. The reflective sheet 25 is disposed on the bottom frame 50 and has a color of white or silver. The light guide plate 21 is disposed on the reflective sheet 25, and the optical sheet 23 is disposed on or over the light guide plate 21.

The LED assembly 29 is disposed at a side of the light guide plate 21 and includes an LED printed circuit board (PCB) 27 and an LED 28 arranged on the LED PCB 27.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modularization.

A position of the elements of the backlight unit 20, e.g., the light guide plate 21 and the optical sheet 23 is fixed by the main frame 30. In addition, the main frame 30 guides the liquid crystal panel 10.

On the other hand, minimization of a bezel, where an image is not displayed because of the LED assembly 29, the main frame 30, the top frame 40, is preferable. Namely, an LCD device including smaller bezel and larger image-display region is preferable. This LCD device may be referred to as a narrow bezel structure LCD device.

To meet this preference, an end of the main frame 30 and an end of the display region are matched to increase the image-display region.

However, in this instance, the light from the LED assembly 29 is directly incident to the liquid crystal panel 10 without passing through the light guide plate 21 and the optical sheet 23 such that problems, e.g., brightness line defect and hot spots, are generated. To avoid these problems, a light-shielding element such as a light-shielding film is attached onto a top edge of the light guide plate 21 or a bottom edge of the liquid crystal panel 10.

Unfortunately, there are disadvantages in production costs and production yield and limitations for the narrow bezel structure.

SUMMARY OF THE INVENTION

Accordingly, the present invention is directed to an LCD device that substantially obviates one or more of the problems due to limitations and disadvantages of the related art.

An object of the present invention is to increase an image-display region of an LCD device and decreasing a bezel without problems of brightness line defect and hot spots.

Another object of the present invention is to provide an LCD device being capable of preventing damages in an optical sheet and motions of the optical sheet.

Another object of the present invention is to provide an LCD device having a thin profile.

Another object of the present invention is to provide an LCD device having a large size without mura defects.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a liquid crystal panel; a backlight unit disposed under the liquid crystal panel and including a light guide plate and a light emitting diode (LED) assembly at a side of the light guide plate; a main frame surrounding a side of the backlight unit and having a light-diffusion property.

In another aspect, a liquid crystal display (LCD) device includes a first sub-LCD device including a first liquid crystal panel, a first backlight unit disposed under the first liquid crystal panel and including a first light guide plate and a first light emitting diode (LED) assembly at a side of the first light guide plate and a first main frame surrounding a side of the first backlight unit; and a second sub-LCD device including a second liquid crystal panel, a second backlight unit disposed under the second liquid crystal panel and including a second light guide plate and a second LED assembly at a side of the second light guide plate and a second main frame surrounding a side of the second backlight unit, wherein at least one of the first and second main frames includes a material having a light-diffusion property.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a schematically exploded perspective view of an LCD device according to an embodiment;

DETAILED DESCRIPTION OF THE PREFERRED EMBODIMENTS

Figure 1:
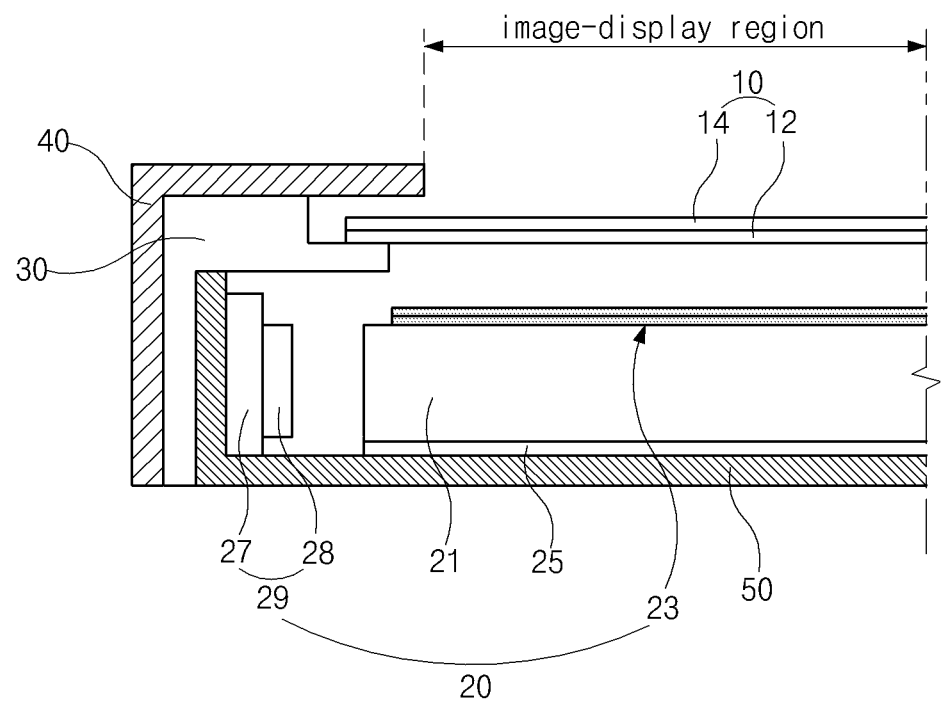
FIG. 1 is a cross-sectional view of the related art LCD device.

Reference will now be made in detail to the embodiments of the present disclosure, examples of which are illustrated in the accompanying drawings.

FIG. 2 is a schematically exploded perspective view of an LCD device according to the present invention.

As shown in FIG. 2, an LCD device includes a liquid crystal panel 110, 210, 310 and 410, a backlight unit 120, 220, 320 and 420, a main frame 130, 230, 330 and 430 and a bottom frame 150, 250, 350 and 450.

The liquid crystal panel 110, 210, 310 and 410 includes a first substrate 112, 212, 312 and 412, a second substrate 114, 214, 314 and 414 and a liquid crystal layer (not shown). The first substrate 112, 212, 312 and 412 and the second substrate 114, 214, 314 and 414 face each other, and the liquid crystal layer is interposed therebetween.

When the liquid crystal panel 110, 210, 310 and 410 is an active matrix type, a gate line (not shown) and a data line (not shown) are formed on the first substrate 112, 212, 312 and 412. The gate and data lines cross each other to define a pixel region. A thin film transistor (TFT) (not shown) is formed at a crossing portion of the gate and data lines. A pixel electrode (not shown) is formed in each pixel region and connected to the TFT. The first substrate 112, 212, 312 and 412 may be referred to as an array substrate.

On the second substrate 114, 214, 314 and 414, a black matrix (not shown) having an opening, which corresponding to the pixel region, is formed. A color filter layer including red, green and blue sub-color filters is formed in the opening. A common electrode is formed on the color filter layer. The second substrate 114, 214, 314 and 414 may be referred to as a color filter substrate.

When the TFT is turned on by a scanning signal form a gate driving circuit, an image signal is applied to the pixel electrode. Then, the liquid crystal layer is driven by an electric field generated between the pixel and common electrodes. As a result, light transmissivity of the liquid crystal layer is controlled such that the LCD device can produce an image.

Although not shown, an orientation film for determining an initial arrangement of liquid crystal molecules is disposed between the first substrate 112, 212, 312 and 412 and the liquid crystal layer and between the second substrate 114, 214, 314 and 414 and the liquid crystal layer. In addition, a seal pattern preventing leakage of liquid crystal molecules is formed along an edge of one of the first substrate 112, 212, 312 and 412 and the second substrate 114, 214, 314 and 414, and first and second polarization plates may be formed at an outer side of the first substrate 112, 212, 312 and 412 and the second substrate 114, 214, 314 and 414, respectively.

The backlight unit 120, 220, 320 and 420 for providing light onto the liquid crystal panel 110, 210, 310 and 410 is disposed under the liquid crystal panel 110, 210, 310 and 410. The backlight unit 120, 220, 320 and 420 includes a light guide plate 121, 221, 321 and 421, a reflective sheet 125, 225, 325 and 425 and an LED assembly 129, 229, 329 and 429.

The light guide plate 121, 221, 321 and 421 is disposed under the liquid crystal panel 110, 210, 310 and 410, and the reflective sheet 125, 225, 325 and 425 is disposed under the light guide plate 121, 221, 321 and 421.

The LED assembly 129, 229, 329 and 429 is disposed at a side of the light guide plate 121, 221, 321 and 421 to provide light toward the light guide plate 121, 221, 321 and 421.

An optical sheet 123, 223, 323 and 423 is disposed over the light guide plate 121, 221, 321 and 421. Namely, the optical sheet 123, 223, 323 and 423 is disposed between the liquid crystal panel 110, 210, 310 and 410 and the light guide plate 121, 221, 321 and 421. For example, the optical sheet 123, 223, 323 and 423 may include a diffusion sheet and a light-concentration sheet.

The light from the LED assembly 129, 229, 329 and 429 is incident to the light guide plate 121, 221, 321 and 421 and diffused within the light guide plate 121, 221, 321 and 421. The light is processed into a plane light source by the light guide plate 121, 221, 321 and 421, and thereby providing into the liquid crystal panel 110, 210, 310 and 410.

The light is reflected by the reflective sheet 123, 223, 323 and 423 under the light guide plate 121, 221, 321 and 421 such that the optical efficiency is improved.

The LED assembly 129, 229, 329 and 429 at a side of the light guide plate 121, 221, 321 and 421 includes an LED PCB 127, 227, 327 and 427 and an LED 128, 228, 328 and 428 arranged on the LED PCB 127, 227, 327 and 427. Namely, the backlight unit 120, 220, 320 and 420 may be referred to as an edge type backlight unit.

The main frame 130, 230, 330 and 430 surrounds a side of the backlight unit 120, 220, 320 and 420 and covers an upper side of the LED assembly 129, 229, 329 and 429 and front edges of the light guide plate 121, 221, 321 and 421. In addition, the main frame 130, 230, 330 and 430 supports bottom edges of the liquid crystal panel 110, 210, 310 and 410. The bottom frame 150, 250, 350 and 450 covers a bottom of the backlight unit 120, 220, 320 and 420 and combined with the main frame 130, 230, 330 and 430.

The main frame 130, 230, 330 and 430 is formed of a material having a light-diffusion property. For example, the main frame 130, 230, 330 and 430 may include a base, which is formed of polycarbonate or polystyrene, and a bead to have the light-diffusion property. Alternatively, a diffusion pattern may be formed on at least one surface of the base with or without the bead.

Since the main frame 130, 230, 330 and 430 having the light-diffusion property covers the upper side of the LED assembly 129, 229, 329 and 429 and the front edges of the light guide plate 121, 221, 321 and 421, the light passing through an edge of a light-incident portion of the light guide plate 121, 221, 321 and 421, which is adjacent to the LED assembly 129, 229, 329 and 429, is diffused by the main frame 130, 230, 330 and 430.

In addition, since an end of the main frame 130, 230, 330 and 430 is inclined toward the LED assembly 129, 229, 329 and 429 and the light guide plate 121, 221, 321 and 421, the diffused light by the main frame 130, 230, 330 and 430 is provided toward the liquid crystal panel 110, 210, 310 and 410. Accordingly, the LCD device has an image-display region being substantially the same as a plane area of an outer dimension of the main frame 130, 230, 330 and 430.

Namely, in the related art LCD device, since the main frame is formed of an opaque material, which does not have the light-diffusion property, and covers the front edges of the light guide plate, an end of the image-display region is an end of an opening in the main frame. In addition, the problems of brightness line defects and hot sports are generated because of light leakage at the end of the main frame, the light-shield element is required such that the image-display region is further reduced.

However, in the present invention, the main frame 130, 230, 330 and 430 is formed of a material having a light-diffusion property, and an end of the main frame 130, 230, 330 and 430 is inclined toward the LED assembly 129, 229, 329 and 429 and the light guide plate 121, 221, 321 and 421 to cover the upper side of the LED assembly 129, 229, 329 and 429 and the front edges of the light guide plate 121, 221, 321 and 421. As a result, the light from the LED assembly 129, 229, 329 and 429 and the edge of the light guide plate 121, 221, 321 and 421 is diffused by the main frame 130, 230, 330 and 430 and provided into the liquid crystal panel 110, 210, 310 and 410. In addition, the LCD device has an image-display region being substantially the same as a plane area of an outer dimension of the main frame 130, 230, 330 and 430. A light transparency of the main frame 130, 230, 330 and 430 can be about 40-70%.

Namely, the LCD device having a minimized bezel and a maximized image-display region is provided.

Figure 3A:
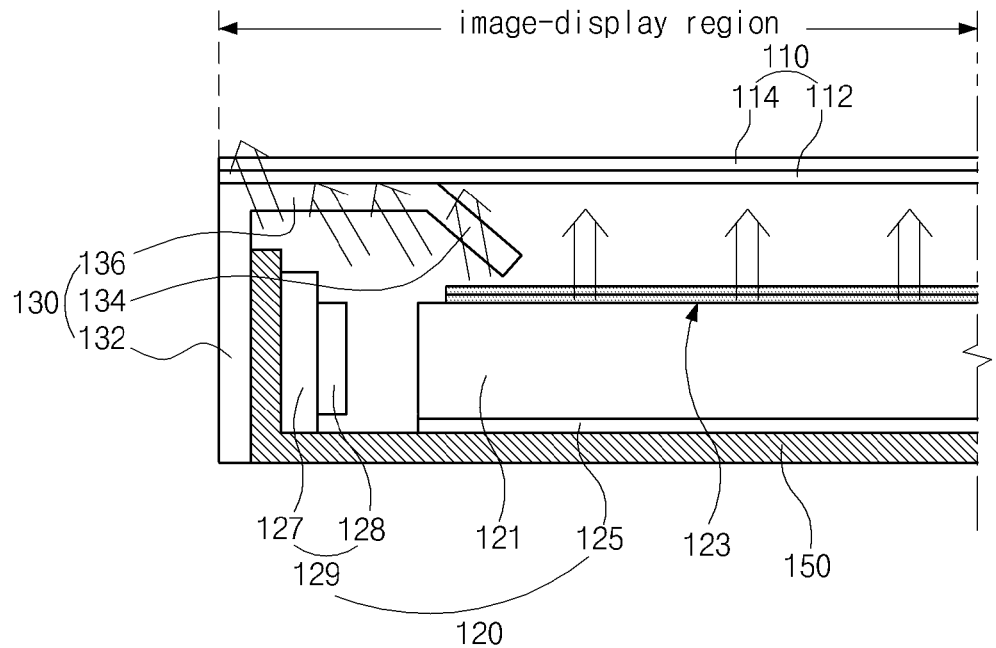
FIGS. 3A and 3B are schematic cross-sectional views of an LCD device according to a first embodiment of the present disclosure.
Figure 3B:
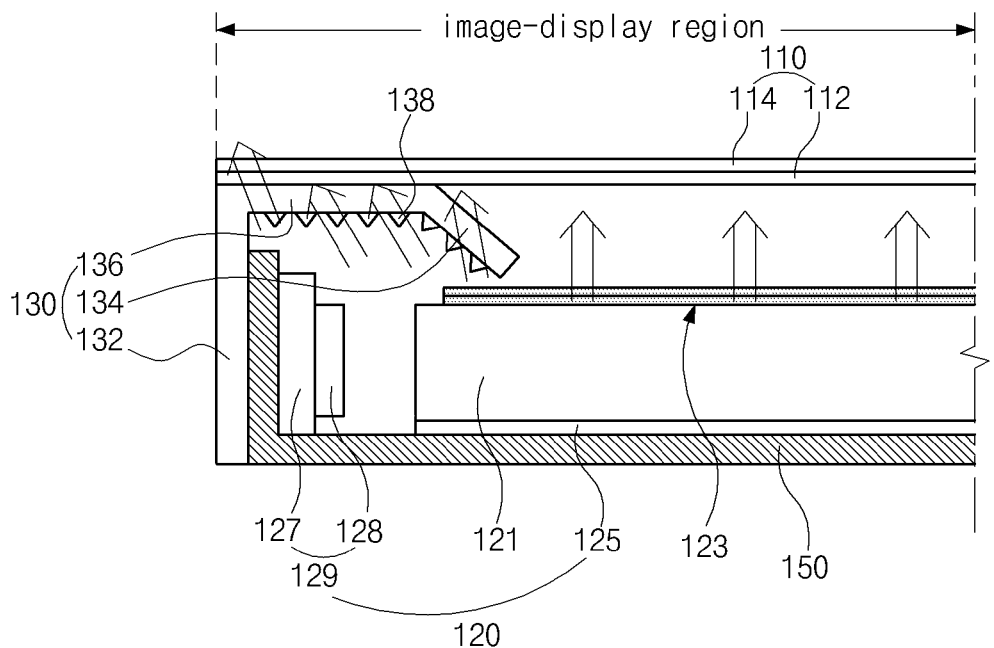

FIGS. 3A and 3B are schematic cross-sectional views of an LCD device according to a first embodiment of the present invention, respectively.

As shown in FIG. 3A, an LCD device includes a liquid crystal panel 110, a backlight unit 120, a main frame 130 and a bottom frame 150.

The liquid crystal panel 110 includes a first substrate 112, a second substrate 114 and a liquid crystal layer (not shown). The first substrate 112 and the second substrate 114 face each other, and the liquid crystal layer is interposed therebetween. The liquid crystal panel 110 has a plane area being substantially the same as a plane area of an outer dimension of the main frame 130.

The backlight unit 120 is disposed under the liquid crystal panel 110 and provides light onto the liquid crystal panel 110. The LCD device displays images using the light and a transmittance difference resulting from an operation of the liquid crystal layer.

The backlight unit 120 includes a light guide plate 121, a reflective sheet 125 and an LED assembly 129.

The light guide plate 121 is disposed under the liquid crystal panel 110, and the reflective sheet 125 is disposed under the light guide plate 121.

The LED assembly 129 is disposed at a side of the light guide plate 121 to provide light toward the light guide plate 121.

An optical sheet 123 is disposed over the light guide plate 121. Namely, the optical sheet 123 is disposed between the liquid crystal panel 110 and the light guide plate 121. For example, the optical sheet 123 may include a diffusion sheet and a light-concentration sheet.

The light from the LED assembly 129 is incident to the light guide plate 121 and diffused within the light guide plate 121. The light is processed into a plane light source by the light guide plate 121, and thereby providing into the liquid crystal panel 110.

The light is reflected by the reflective sheet 123 under the light guide plate 121 such that the optical efficiency is improved.

The LED assembly 129 at a side of the light guide plate 121 includes an LED PCB 127 and an LED 128 arranged on the LED PCB 127.

The bottom frame 150 includes a bottom surface and four side surface extending from the bottom surface. The LED assembly 129 is attached to one of the four side surface of the bottom frame 150.

The main frame 130 includes a first portion 132, which is perpendicular to the liquid crystal panel 110, a second portion 134, which is inclined toward the light guide plate 121, and a third portion 136 connecting the first and second portions 132 and 134 and being parallel to the liquid crystal panel 110.

Namely, the first portion 132 of the main frame 130 surrounds the side of the backlight unit 120, and the second portion 134 of the main frame 130 covers the front edge of the light guide plate 121. In addition, the third portion 136 of the main frame 130 covers the upper side of the LED assembly 129. Moreover, the liquid crystal panel 110 is supported by an end of the first portion 132 of the main frame 130 and the third portion 136 of the main frame 130, and the first portion 132 of the main frame 130 is combined with the bottom frame 150 covering the bottom of the backlight unit 120.

As mentioned above, since the main frame 130 having the light-diffusion property covers the upper side of the LED assembly 129 and the front edges of the light guide plate 121, the light passing through an edge of a light-incident portion of the light guide plate 121, which is adjacent to the LED assembly 129, is diffused by the main frame 130.

In this instance, each of the second and third portions 134 and 136 of the main frame 130 is formed of a material having the light-diffusion property. However, the material of the first portion 132 of the main frame 130 is not limited thereto. The first portion 132 of the main frame 130 may be formed of a material having the light-diffusion property. Alternatively, the first portion 132 of the main frame 130 may be formed of an opaque mold material.

On the other hand, even if the main frame has the light-diffusion property, there is limitation in the light diffusion by the main frame when the main frame includes a vertical portion and a horizontal portion without an inclined portion.

Namely, since the main frame 130 of the present invention includes the second portion 134, which is inclined toward the light guide plate 121, the light, which is incident to an end of the second portion 134 is diffused to an edge of the LCD device via the second portion 134. However, when the main frame includes the vertical portion and the horizontal portion without the inclined portion, the light, which is incident to an end of the horizontal portion from an end of the light guide plate, is diffused only along a vertical direction. Accordingly, only a portion of the main frame can serve as an image-display region.

In the present invention, since the light is diffused to the edge of the LCD device by the main frame 130 including the second portion 134, which is inclined toward the light guide plate 121, the LCD device has an image-display region being substantially the same as a plane area of an outer dimension of the main frame 130.

In other words, in the related art LCD device, a region, where the LED assembly and the main frame are positioned, can not serve as the image-display region such that a width of the bezel is increased. However, in the LCD device according to the present invention, a region, where the LED assembly and the main frame are positioned, serves as the image-display region such that an area of the image-display region is maximized and a width of the bezel is minimized.

In FIG. 3A, the main frame 130 includes the base, which is formed of polycarbonate or polystyrene, and the bead to have the light-diffusion property. Alternatively, as shown in FIG. 3B, by forming a diffusion pattern 138 at a bottom surface of the second and third portions 134 and 136 of the main frame 130, the main frame 130 may have the light-diffusion property. For example, the diffuse pattern 138 may have one of a triangle shape, a half-circle shape, an oval shape and a trapezoid shape.

When the main frame 130 includes the first portion 132 and the second portion 134, which is directly extended from the first portion 132, without the third portion 136, the diffusion pattern 138 may be formed at only the second portion 134.

Namely, the diffusion pattern 138 is not formed at the first portion 132. If the first portion 132 includes the diffusion pattern 138, a gap may be generated at a contact portion between the first portion 132 of the main frame 130 and the bottom frame 150 such that an influx problem of particles from an outer side to the backlight unit 120.

FIGS. 3A and 3B respectively show the main frame 130 including the first to third portions 132, 134 and 136. However, the shape of the main frame 130 is not limited thereto.

Figure 4:
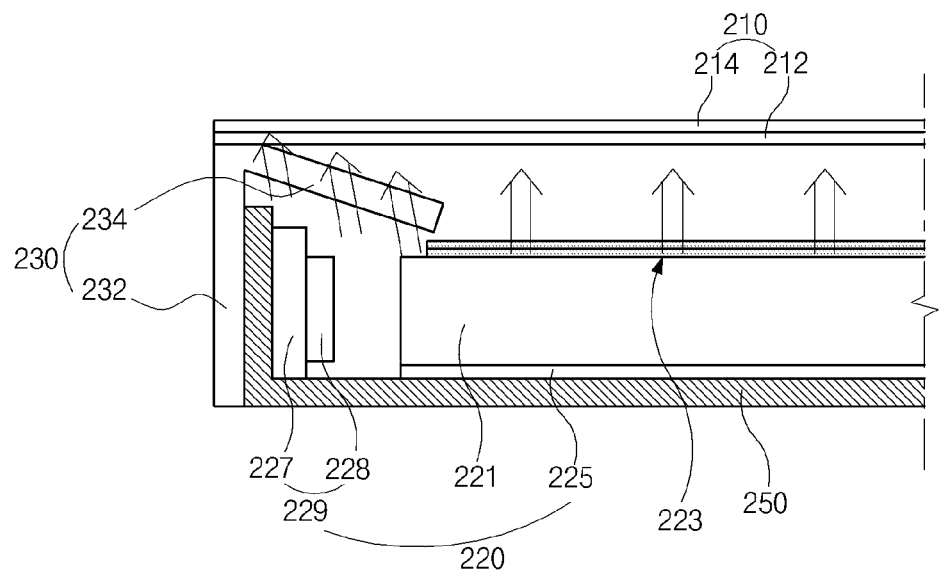
FIG. 4 is a schematic cross-sectional view of an LCD device according to a second embodiment of the present disclosure.

Referring to FIG. 4, which is a schematic cross-sectional view of an LCD device according to a second embodiment of the present invention, the main frame 230 includes a first portion 232 being perpendicular to the liquid crystal panel 210 and a second portion 234 extending from the first portion 232 to be inclined toward the light guide plate 221.

Namely, in comparison to the main frame in FIG. 3A, the second portion 234 of the main frame 230 is directly extended from the first portion 232 without the third portion 136 (of FIG. 3A).

In the LCD device in FIG. 4, the first portion 232 of the main frame 230 surrounds the side of the backlight unit 220, and the second portion 234 of the main frame 130 covers the upper side of the LED assembly 229 and the front edge of the light guide plate 221. In addition, the liquid crystal panel 210 is supported by an end of the first portion 232 of the main frame 230.

As mentioned above, the light passing through an edge of a light-incident portion of the light guide plate 221, which is adjacent to the LED assembly 229, is diffused by the second portion 234, which is inclined toward the light guide plate 221, of the main frame 130 such that an entire of a plane area of the main frame 130 serves as the image-display region.

Figure 5:
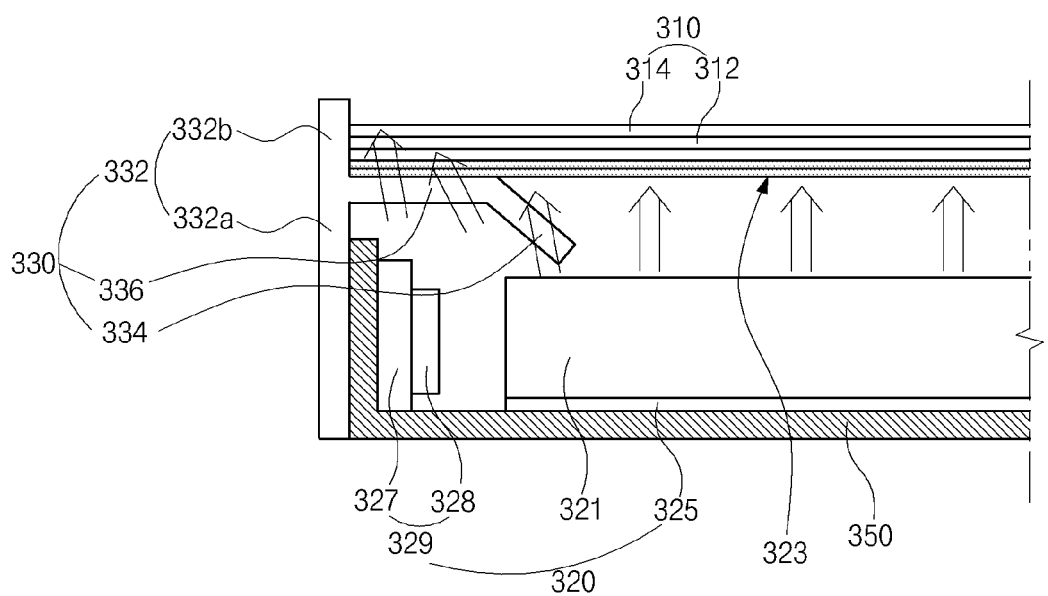
FIG. 5 is a schematic cross-sectional view of an LCD device according to a third embodiment of the present disclosure.

Referring to FIG. 5, which is a schematic cross-sectional view of an LCD device according to a third embodiment of the present invention, the main frame 330 includes a first portion 332, which includes a first vertical portion 332a and a second vertical portion 332b, a second portion 334 extending downward direction with respect to the first portion 332 and a third portion 336 connecting the first and second portions 332 and 334 and being parallel to the liquid crystal panel 310.

In this instance, the first vertical portion 332a surrounds the side of the backlight unit 320, and a side of the liquid crystal panel 310 is supported by the second vertical portion 332b.

In addition, an optical sheet 323 may be disposed between the liquid crystal panel 310 and the third portion 336 of the main frame 330.

In the LCD device in FIG. 5, since the second vertical portion 332b surrounds the side of the liquid crystal panel 310, unnecessary motions of the liquid crystal panel 310 is prevented and the liquid crystal panel 310 is stably installed.

The first portion 332 including the first vertical portion 332a and the second vertical portion 332b is applied to the main frame shown in FIG. 4.

Figure 6:
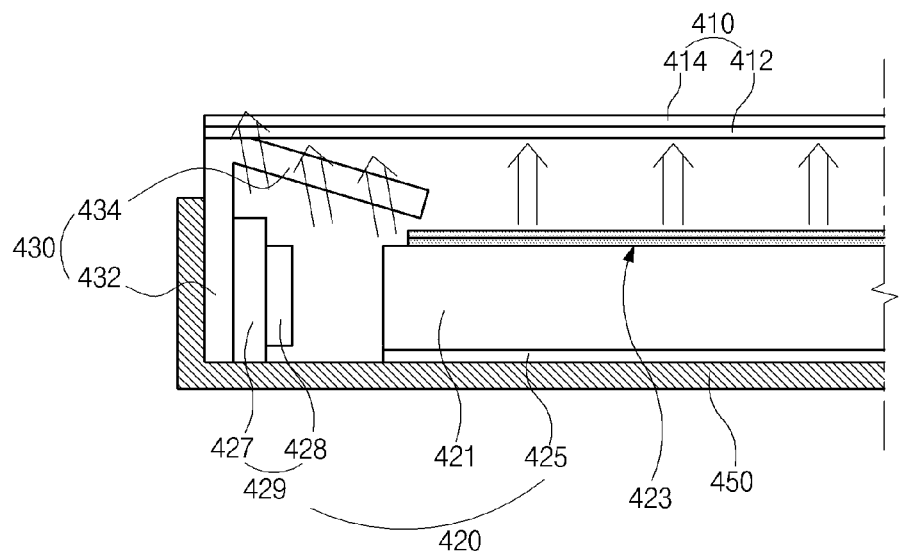
FIG. 6 is a schematic cross-sectional view of an LCD device according to a fourth embodiment of the present disclosure.

On the other hand, referring to FIG. 6, which is a schematic cross-sectional view of an LCD device according to a fourth embodiment of the present invention, the LED PCB 427 of the LED assembly 429 is attached on the first portion 432 of the main frame 430, and a side surface of the bottom frame 450 is combined with the first portion 432 of the main frame 430 from an outer side direction.

FIGS. 2 to 6 show the LCD device without a top frame. However, the LCD device may include the top frame covering front edges of the liquid crystal panel and being combined with the main frame and/or the bottom frame. In this instance, a top portion, which covers the front edges of the liquid crystal panel, has a width being equal to or smaller than the first portion of the main frame such that the image-display region is not reduced by the top frame.

As mentioned above, in the LCD device of the present invention, the main frame includes an inclined portion and is formed of a material having the light-diffusion property such that the light from the LED assembly and passing through an edge of the light guide plate is diffused by the main frame toward the outside. Accordingly, the LCD device of the present invention has the image-display region being substantially the same as the plane area of an outer dimension of the main frame. Namely, the LCD device has the minimized bezel and the maximized display region without the problems of brightness line defects and the hot spots.

In the above LCD device, unnecessary motions of the optical sheet may be generated. Namely, the related art LCD device may include an element for fixing the optical sheet. However, when an element for fixing the optical sheet is formed at the main frame, which is formed of a material having the light-diffusion property, the image-display region is limited by the element for fixing the optical sheet. Hereinafter, new main frame being capable of fixing the optical sheet without limitation of the image-display region is introduced.

Figure 7A:
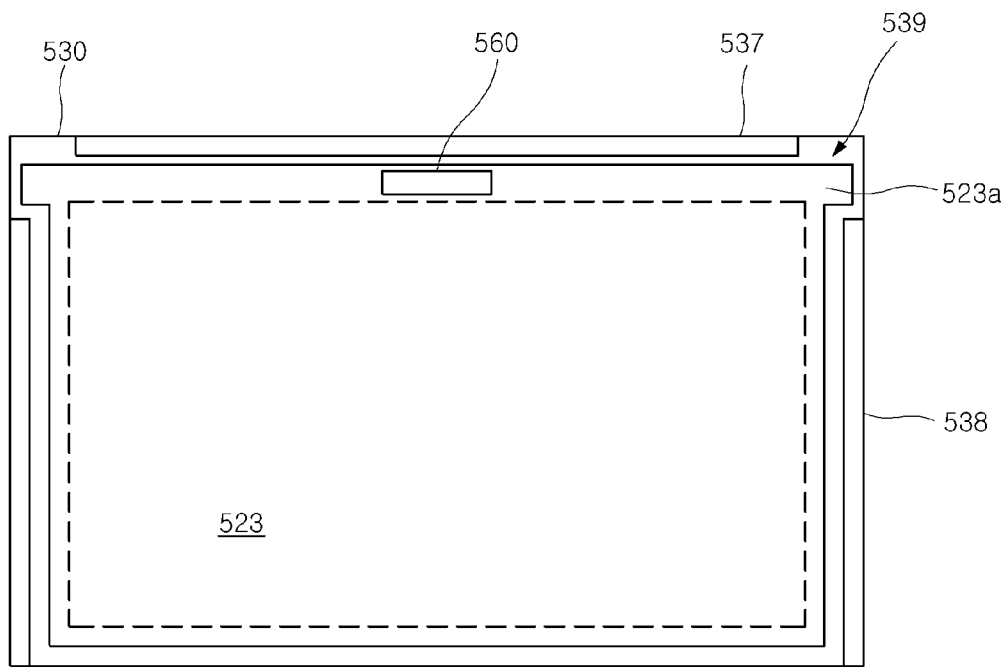
FIGS. 7A and 7B are a schematic plane view and a perspective view, respectively, showing an LCD device with an optical sheet of the present disclosure.
Figure 7B:
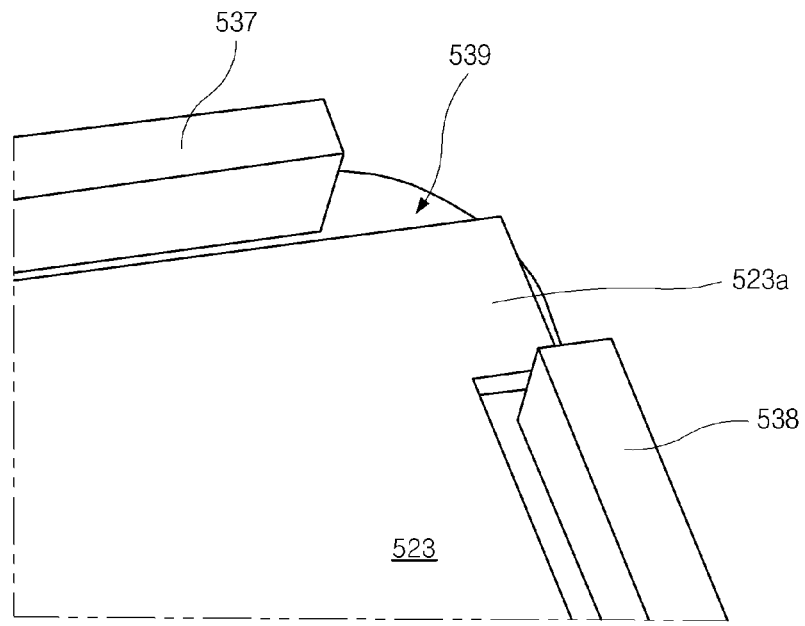

FIGS. 7A and 7B are schematic plane view and perspective view showing an LCD device with an optical sheet in the present invention, respectively.

As shown in FIGS. 7A and 7B, an optical clear (transparent) adhesive 560 having an island shape is formed at a point of an upper surface of the main frame 530, which is formed of a material having the light-diffusion property, and the optical sheet 523 is fixed by the optical clear adhesive 560. A light transparency of the main frame 530 can be about 40-70%. The optical clear adhesive 560 as an element for fixing the optical sheet 523 does not limit the image-display region of the LCD device.

In addition, since the optical sheet 523 is fixed in a point adhesion by the optical clear adhesive 560 of the island shape, generation of thermal deformation wrinkles is prevented.

Namely, when the optical clear adhesive is formed on an entire of the upper surface of the main frame and the optical sheet is attached, the optical sheet may be wrinkled because of thermal expansion. However, in the present invention, since the optical sheet 523 is fixed in a point adhesion by the optical clear adhesive 560 of the island shape, the above problem is prevented.

On the other hand, with the point adhesion, the optical sheet may be sagged when the LCD device is used as a standing type. To prevent the problem, a first main frame rib 537 is formed at one side of an upper surface of the main frame 530, and a second main frame rib 538 is formed at another side of the upper surface of the main frame 530. The first and second main frame ribs 537 and 538 are formed at adjacent sides to form an aperture 539 at their crossing portion.

The optical sheet 523, which is attached in a point adhesion onto the main frame 530, includes a protrusion 523a at least one corner, and the protrusion 523a is inserted into the aperture 539. As a result, the sagging problem of the optical sheet 523 is prevented.

Hereinafter, thin profile and large size LCD device using the light-diffusion main frame is introduced.

In the related art LCD device, polarizing plates are required at upper and lower sides of the liquid crystal panel. In the large size LCD device, production costs and a thickness of the LCD device are increased because of the polarization plates.

In the present invention, the LCD device includes a reflective polarization film instead of the polarization plate at a lower side of the liquid crystal panel to provide the LCD device with lowered production costs and a thin profile.

Figure 8:
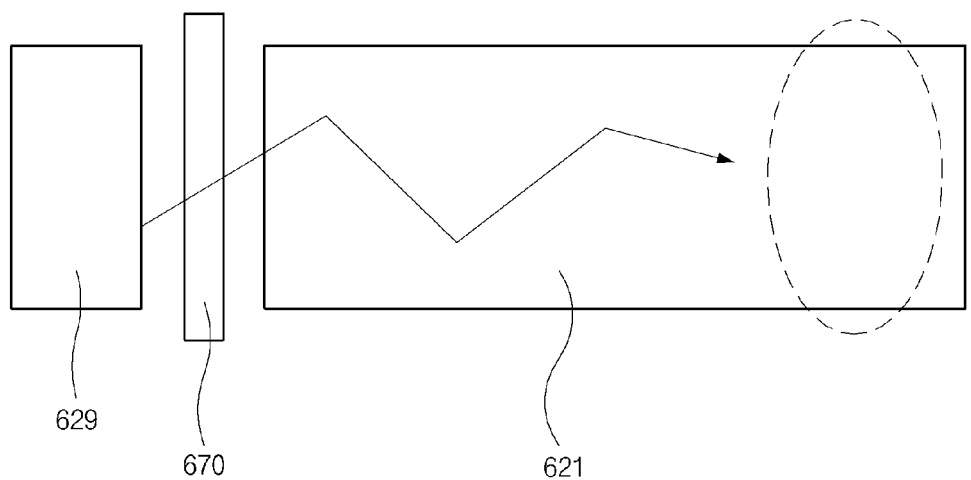
FIG. 8 is a schematic cross-sectional view of a backlight unit of the present disclosure.

Referring to FIG. 8, which is a schematic cross-sectional view of a backlight unit including a reflective polarization film, the reflective polarization film 670 is positioned between the LED assembly 629 as a light source and the light guide plate 621 such that the light from the backlight unit has a polarization property.

Namely, the light from the LED assembly 629 is processed into a polarized light by the reflective polarization film 670, which having a transmission axis along one direction, and provided to the light guide plate 621. The polarized light is processed in the light guide plate 621 and provided to the liquid crystal panel.

In addition, the light, which does not pass the transmission axis of the reflective polarization film 670, is reflected and re-incident onto the reflective polarization film 670. As a result, optical efficiency is increased.

With the reflective polarization film 670, since the light from the LED assembly 629, which is processed into the polarized light by the reflective polarization film 670, is provided to the liquid crystal panel through the light guide plate 621, a lower polarization plate in the related art LCD device is omitted. Accordingly, increase of the production costs and the thickness of the LCD device by the polarization plate is prevented.

On the other hand, there is limitation in using the reflective polarization film with the large size LCD device.

Namely, a polarization property of the polarized light by the reflective polarization film is damaged (broken) at opposite end of the light guide plate in the large size LCD device. As a result, the light having undesired polarization property, by which optical efficiency is decreased, is provided to the liquid crystal panel such that image displaying quality is decreased.

To overcome these problems, new LCD device is introduced with reference to FIGS. 9A, 9B, 10, 11A and 11B.

Figure 9A:
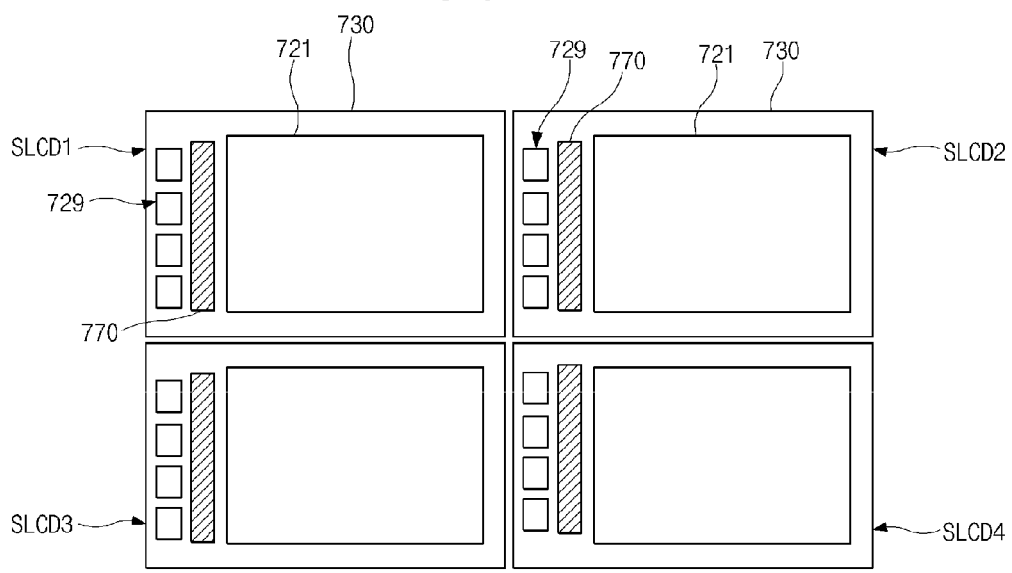
FIGS. 9A and 9B are cross-sectional views of an LCD device according to fifth and sixth embodiments of the present disclosure.
Figure 9B:
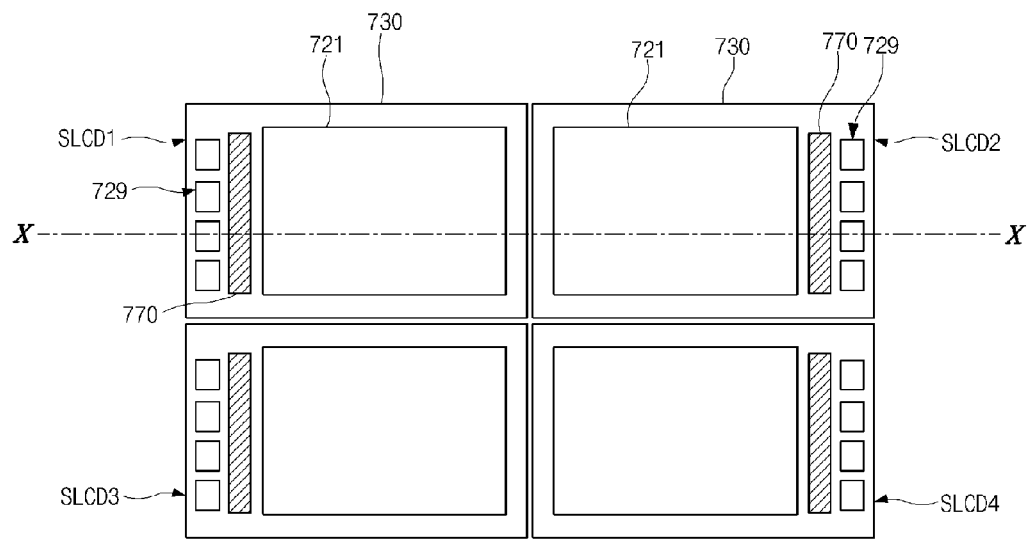
Figure 10:
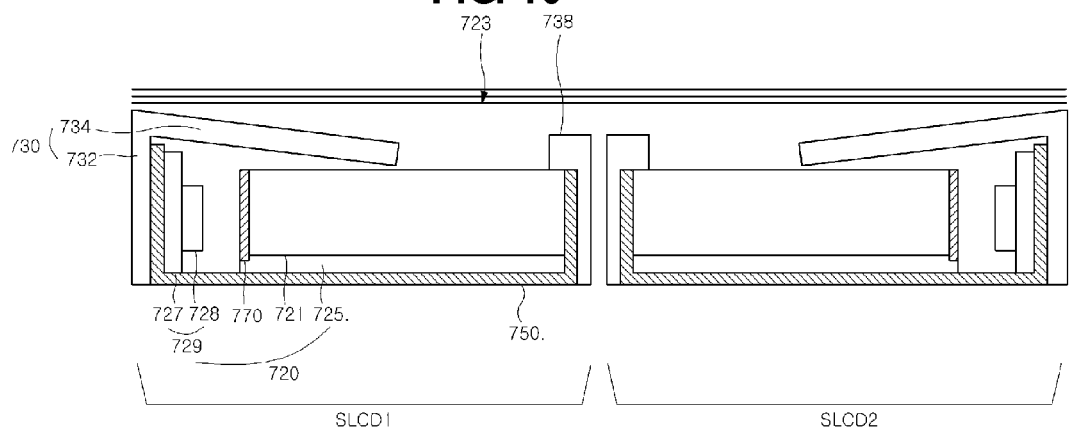
FIG. 10 is a schematic cross-sectional view taken along the line X-X in FIG. 9B.
Figure 11A:
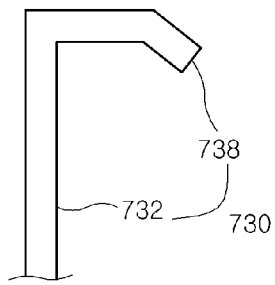
FIGS. 11A and 11b are schematic perspective views showing a main frame of an LCD device according to the present disclosure.
Figure 11B:
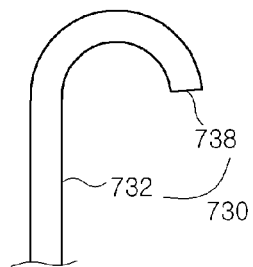

FIGS. 9A and 9B are cross-sectional views of an LCD device according to fifth and sixth embodiments of the present invention, and FIG. 10 is a schematic cross-sectional view taken along the line X-X in FIG. 9B. FIGS. 11A and 11b are schematic perspective views showing a main frame of an LCD device according to the present invention.

As shown in FIGS. 9A and 9B, the LCD device of the present invention includes a plurality of sub-LCD devices, i.e., first to fourth sub-LCD devices SLCD1, SLCD2, SLCD3 and SLCD4. The first to fourth sub-LCD devices SLCD1, SLCD2, SLCD3 and SLCD4 are arranged in a 2*2 matrix shape to form one large size LCD device. FIGS. 9A and 9B shows four sub-LCD devices SLCD1, SLCD2, SLCD3 and SLCD4. However, it is not limited thereto. For example, two sub-LCD devices may be arranged or nine sub-LCD devices may be arranged in a 3*3 matrix shape.

Each of the first to fourth sub-LCD devices SLCD1, SLCD2, SLCD3 and SLCD4 includes a liquid crystal panel (not shown), a backlight unit 720 (of FIG. 10) under the liquid crystal panel, a main frame 730 and a bottom frame 750.

The main frame 730 includes a material having a light-diffusion property such that an image-display region of each of the first to fourth sub-LCD devices SLCD1, SLCD2, SLCD3 and SLCD4 is increased. A light transparency of the main frame 730 can be about 40-70%.

The backlight unit 720 includes a light guide plate 721, an LED assembly 729 as a light source at a side of the light guide plate 721, a reflective polarization film 770 positioned between the light guide plate 721 and the LED assembly 729, and a reflective sheet 725 (of FIG. 10) under the light guide plate 721. The reflective sheet 725 reflects the light from a bottom surface of the light guide plate 721 such that the optical efficiency is increase. The reflective sheet 725 may be omitted.

Referring to FIG. 9A, the LED assembly 729 of the first sub-LCD device SLCD1 is disposed at a side of the light guide plate 721 of the first sub-LCD device SLCD1, and the LED assembly 729 of the second sub-LCD device SLCD2 is disposed between the light guide plate 721 of the first sub-LCD device SLCD1 and the light guide plate 721 of the second sub-LCD device SLCD2. Namely, the light guide plate 721 of the first sub-LCD device SLCD1 and the LED assembly 729 of the second sub-LCD device SLCD2 are disposed between the LED assembly 729 of the first sub-LCD device SLCD1 and the light guide plate 721 of the second sub-LCD device SLCD2.

On the other hand, referring to FIG. 9B, the light guide plates 721 of each of the first and second sub-LCD devices SLCD1 and SLCD2 are disposed between the LED assemblies 729 of each of the first and second sub-LCD devices SLCD1 and SLCD2. Namely, the light guide plates 721 of each of the first and second sub-LCD devices SLCD1 and SLCD2 are arranged to be adjacent to each other.

In the LCD device in FIGS. 9A and 9B, the light from the LED assemblies 729 of each of the first to fourth sub-LCD devices SLCD1, SLCD2, SLCD3 and SLCD4 is processed into a polarized light by the reflective polarization film 770 and provided to the liquid crystal panel after traveling the light guide plate 721, which has a length (width) being half of a total length (width) of the LCD device.

The light guide plate in the large size LCD device has a enlarged length. Accordingly, as mentioned above, the polarization property is damaged for traveling the light guide plate. However, since the light guide plate in the present invention has the length smaller than the LCD device, the above problem is prevented.

On the other hand, in the case of constituting the large size LCD device by arranging a plurality of sub-LCD devices, a mura problem is generated at boundaries of the sub-LCD devices. Namely, since the main frame or the bottom frame, which surrounds an outer side of the sub-LCD device, is positioned at the boundaries of the sub-LCD devices, the boundaries of the sub-LCD devices become a non-display region such that non-uniformity in the displayed light is generated. As a result, the mura problem is generated at the boundaries of the sub-LCD devices.

However, since the main frame 730 in the present invention is formed of the material having the light-diffusion property, the boundaries of the sub-LCD devices serve as an image-display region. Accordingly, the above mura problem is prevented.

Referring to FIG. 10, in each of the first and second sub-LCD devices SLCD1 and SLCD2, the backlight unit 720 is disposed under the liquid crystal panel (not shown), and the optical sheet 723 is disposed between the liquid crystal panel and the light guide plate 721. A side of the backlight unit 720 is surrounded by the main frame 730, and a bottom of the backlight unit 720 is covered with the bottom frame 750.

FIG. 10 shows that two bottom frames 750 respectively cover the first and second sub-LCD devices SLCD1 and SLCD2. However, one bottom frame covers all sub-LCD devices with two main frames 730.

The backlight unit 720 includes the light guide plate 721, the LED assembly 729 at a side of the light guide plate 721. To increase optical efficiency, the backlight unit 720 may include the reflective sheet 725 under the light guide plate 721. To provide a polarized light, the backlight unit 720 may include the reflective polarization film 770 between the LED assembly 729 and the light guide plate 721.

The main frame 730 includes the material having the light-diffusion property. The main frame 730 includes a vertical side surface 732 being perpendicular to the liquid crystal panel, a first upper surface 734, which covers the LED assembly 729 and is inclined toward the light guide plate 721, and a second upper surface 738 covering an edge of a side, which is opposite to the LED assembly 729, of the light guide plate 721. Although not shown, the main frame 730 has two other sides having substantially the same shape as the second upper surface 738.

Accordingly, the light from the LED assembly 729 is diffused by the first upper surface 734 such that the image-display region is extended into a portion of the LED assembly 729 and edges of the main frame 730. In addition, due to the second upper surface 738, the mura problem at the boundaries of the adjacent sub-LCD devices SLCD1 and SLCD2 is prevented.

FIG. 10 shows the second upper surface 738 is parallel to the light guide plate 721. Alternatively, the second upper surface 738 may be inclined toward the light guide plate 721 as the first upper surface 734.

The second upper surface 738 may be inclined with respect to the vertical side surface 732 and have a curvature. For example, the second upper surface 738 may include a horizontal portion and an inclined portion as shown in FIG. 11A. The second upper surface 738 may have a cross-section of a half-circle shape as shown in FIG. 11B.

The shapes of the second upper surface 738 in FIGS. 11A and 11B are benefit to diffuse the light. However, since the light is relatively weak at an opposite side of the LED assembly 729, the main frame 730 having the light-diffusion property may be enough to prevent the mura problem. Accordingly, there is no limited for the shape of the second upper surface 738.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal panel;
    a backlight unit disposed under the liquid crystal panel and including a light guide plate, the light guide plate in a plane, and a light emitting diode (LED) assembly at a side of the light guide plate; and
    a main frame surrounding a side of the backlight unit and having a light-diffusion property, the main frame comprising:
        a first portion perpendicular to the liquid crystal panel; and
        a second portion connected to the first portion and disposed between the light guide plate and the liquid crystal panel, the second portion having a surface, the surface inclined toward the plane of the light guide plate;
    wherein the liquid crystal panel covers an upper side of the LED assembly in plan view of the liquid crystal panel and is configured to receive light from the LED assembly that is diffused by the main frame toward the liquid crystal panel.

2. The device according to claim 1, wherein the second portion extends from an end of the first portion.

3. The device according to claim 1, wherein the main frame further includes a third portion horizontally extending from an end of the first portion, the third portion connecting the first portion and the second portion and parallel to the plane of the light guide plate.

4. The device according to claim 1, wherein the first portion includes a first vertical portion corresponding to the backlight unit and a second vertical portion corresponding to a side of the liquid crystal panel.

5. The device according to claim 4, further comprising an optical sheet between the liquid crystal panel and the light guide plate, and a side of the optical sheet is surrounded by the second vertical portion.

6. The device according to claim 2, wherein a diffusion pattern is formed at a bottom surface of the second portion.

7. The device according to claim 1, wherein a plane area of the liquid crystal panel is equal to a plane area of an outer dimension of the main frame.

8. The device according to claim 1, further comprising a bottom frame including a bottom surface covering a bottom of the backlight unit and four side surfaces extending from the bottom surface.

9. The device according to claim 8, wherein the LED assembly is attached to one of the four side surfaces of the bottom frame, and the main frame is combined with the bottom frame from an outer side direction.

10. The device according to claim 8, wherein the LED assembly is attached to the main frame, and the four side surfaces of the bottom frame are combined with the main frame from an outer side direction.

11. The device according to claim 1, further comprising an optical sheet between the liquid crystal panel and the light guide plate.

12. The device according to claim 11, wherein the optical sheet is fixed on the main frame in a point adhesion using an optically clear adhesive.

13. The device according to claim 12, wherein a first main frame rib and a second main frame rib are formed at two upper surfaces of adjacent sides of the main frame, and an aperture is formed at adjacent portions of the first and second main frame ribs, and wherein the optical sheet includes a protrusion at a corner, and the protrusion is inserted into the aperture.

14. The device according to claim 1, wherein the surface of the second portion is inclined at an angle between the first portion and the plane of the light guide plate.

15. The device according to claim 1, wherein the surface of the second portion is inclined at an angle less than 90 degrees with respect to the first portion.

16. A liquid crystal display (LCD) device, comprising:
a first sub-LCD device including a first liquid crystal panel, a first backlight unit disposed under the first liquid crystal panel and including a first light guide plate, the first light guide plate in a first plane, and a first light emitting diode (LED) assembly at a side of the first light guide plate, and a first main frame surrounding a side of the first backlight unit; and
a second sub-LCD device including a second liquid crystal panel, a second backlight unit disposed under the second liquid crystal panel and including a second light guide plate, the second light guide plate in a second plane, and a second LED assembly at a side of the second light guide plate and a second main frame surrounding a side of the second backlight unit,
wherein at least one of the first and second main frames includes a material having a light-diffusion property,
wherein each of the first and second main frames comprises:
a side surface;
a first upper surface connected to the side surface, the first upper surface corresponding to each of the first and second LED assemblies, the first upper surface inclined toward the planes of the first and second light guide plates; and
a second upper surface opposite to each of the first and second LED assemblies,
the first upper surface of the first main frame disposed between the first light guide plate and the first liquid crystal panel, and the first upper surface of the second main frame disposed between the second light guide plate and the second liquid crystal panel,
wherein the first liquid crystal panel covers an upper side of the first LED assembly in plan view of the first liquid crystal panel and is configured to receive light from the first LED assembly that is diffused by the first main frame toward the first liquid crystal panel, and
wherein the second liquid crystal panel covers an upper side of the second LED assembly in plan view of the second liquid crystal panel and is configured to receive light from the second LED assembly that is diffused by the second main frame toward the second liquid crystal panel.

17. The device according to claim 16, wherein the first and second light guide plates are disposed between the first and second LED assemblies.

18. The device according to claim 16, wherein the first light guide plate and the second LED assembly are disposed between the first LED assembly and the second light guide plate.

19. The device according to claim 16, wherein each of the first and second backlight units further includes a reflective polarization film between the first LED assembly and the first light guide plate and between the second LED assembly and the second light guide plate.

20. The device according to claim 16, wherein the second upper surface has an inclined shape with respect to the side surface, a vertical shape with respect to the side surface or a curvature shape in a cross-section.

* * * * *